United States Patent [19]

Hatch

[11] Patent Number: 4,933,224

[45] Date of Patent: Jun. 12, 1990

[54] METHOD FOR ADAPTING SEPARABLE FASTENERS FOR ATTACHMENT TO OTHER OBJECTS

[75] Inventor: Richard N. Hatch, Hooksett, N.H.

[73] Assignee: Velcro Industries, B.V., Amsterdam, Netherlands

[21] Appl. No.: 129,883

[22] Filed: Nov. 25, 1987

Related U.S. Application Data

[63] Continuation of Ser. No. 756,005, Jul. 17, 1985, abandoned.

[51] Int. Cl.⁵ ............................................. A44B 21/00
[52] U.S. Cl. .................................. 428/100; 428/120; 428/308.4; 428/311.1; 428/317.1; 428/329; 428/192; 428/900; 24/306; 24/444
[58] Field of Search ................. 24/306, 444; 428/100, 428/900, 120, 308.4, 311.1, 317.1, 329, 192

[56] References Cited

U.S. PATENT DOCUMENTS

| | | |
|---|---|---|
| 3,181,913 | 5/1965 | Guido et al. . |
| 3,264,382 | 8/1966 | Angell et al. . |
| 3,408,705 | 11/1968 | Kayser et al. . |
| 3,773,875 | 11/1973 | Lammers . |
| 3,870,741 | 3/1975 | Kuhn . |
| 3,940,524 | 2/1976 | Hoppe et al. . |
| 4,012,544 | 3/1977 | Richards .............................. 428/99 |
| 4,216,634 | 8/1980 | Binder . |
| 4,400,336 | 8/1983 | Thomas . |
| 4,420,447 | 12/1983 | Nakashima . |
| 4,454,183 | 6/1984 | Wollman . |
| 4,459,249 | 7/1984 | Matsuda . |
| 4,470,857 | 9/1984 | Casalou ........................... 428/100 X |
| 4,563,380 | 1/1986 | Black et al. ......................... 428/100 |
| 4,617,214 | 10/1986 | Billarant . |
| 4,673,542 | 6/1987 | Wigner et al. . |
| 4,693,921 | 9/1987 | Billarant et al. . |
| 4,710,414 | 12/1987 | Northrup et al. ...................... 428/43 |
| 4,726,975 | 2/1988 | Hatch ................................. 428/100 |

FOREIGN PATENT DOCUMENTS

| | | |
|---|---|---|
| 900878 | 2/1985 | Belgium . |
| 0116357 | 5/1984 | European Pat. Off. . |
| 0145523 | 6/1985 | European Pat. Off. . |
| 0145603 | 6/1985 | European Pat. Off. . |
| 83033211 | 5/1984 | Fed. Rep. of Germany . |
| 2405123 | 5/1979 | France . |
| 2423666 | 11/1979 | France . |
| 7804001 | 11/1979 | France . |
| 2553156 | 4/1985 | France . |
| 2556271 | 6/1985 | France . |
| 2560589 | 9/1985 | France . |
| 2566316 | 12/1985 | France . |
| 57-113932 | 7/1982 | Japan . |
| 57-129472 | 8/1982 | Japan . |
| 59-184599 | 12/1984 | Japan . |
| 60-107324 | 12/1985 | Japan . |
| 60-179003 | 12/1985 | Japan . |

*Primary Examiner*—Alexander S. Thomas
*Attorney, Agent, or Firm*—Hayes, Soloway, Hennessey & Hage

[57] ABSTRACT

An adapted separable fastener and method of making the same for attachment to foam objects such as seat cushions. A separable fastener member of the hook and loop-type is attached, in back-to-back relation, to a second member. The second member has upstanding elements such as loops or hooking elements which elements are ultimately surrounded and encapsulated by the foam during polymerization. The adapted fastener is thereby attached to the foam member. The elements are positioned in order to allow venting of the gaseous byproducts of polymerization. This promotes superior adhesion to the foam material and prevents delamination at the fastener-foam interface. A metal strip may be disposed within the adapted fastener so it may be magnetically held in the foam mold. A method and apparatus for adapting the fastener is also disclosed.

16 Claims, 3 Drawing Sheets

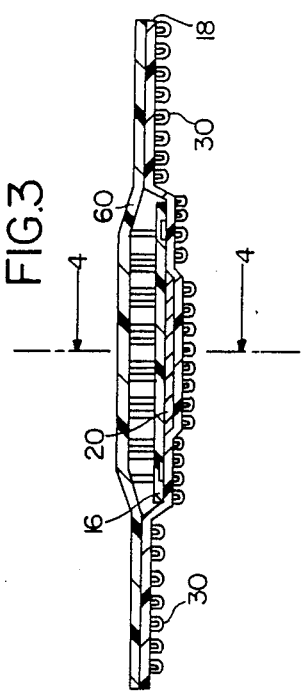
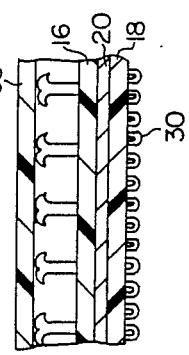
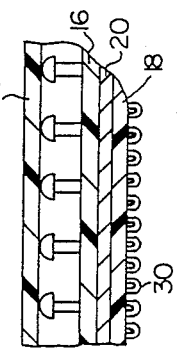
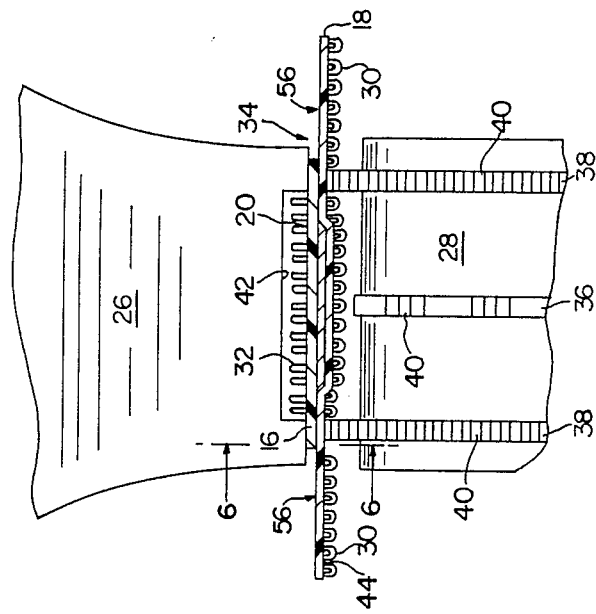

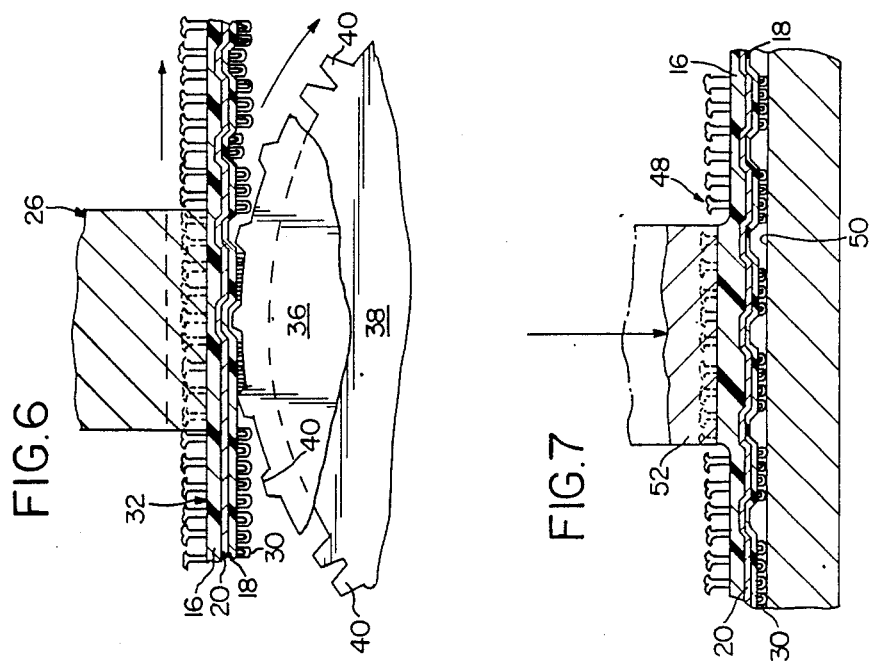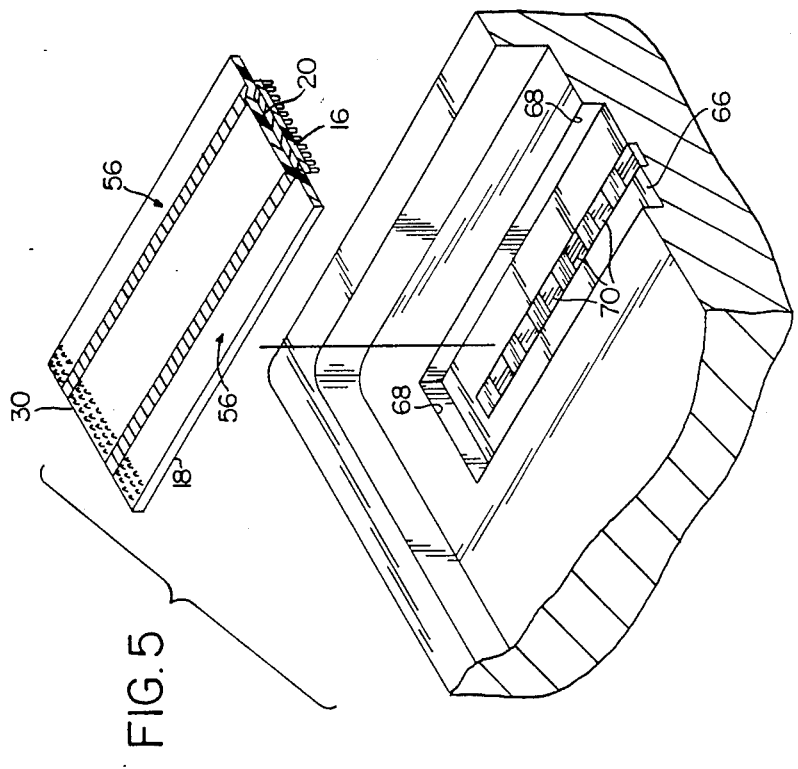

METHOD FOR ADAPTING SEPARABLE FASTENERS FOR ATTACHMENT TO OTHER OBJECTS

This is a continuation of co-pending application Ser. No. 756,005 filed on July 17, 1985 now abandoned.

BACKGROUND OF THE INVENTION

1. Field of the Invention

This invention relates to a method for adapting separable fasteners of the hook and loop-type for attachment to other objects, particularly such objects as polyurethane foam or the like. The resultant unique adapted fastener, simplifies attachment of objects to other objects or members.

2. Description of the Prior Art

Hook and loop fasteners are well known and are used to join two parts detachably to each other. These fastener strips consist of mating fastener tapes having hooks and loops respectively on each tape, which on being pressed together will matingly engage each other to form a separable connection. Such fastener strips are employed where ease of connection and disconnection is desired or where an infinite adjustability within a circumscribed range is desired.

Although originally having their primary use in wearing apparel, such separable fasteners have expanded significantly in use. However, the areas of expansion have sometimes been limited by some of the properties of separable fasteners as now produced. For example, attaching the fasteners to other items has sometimes been difficult which difficulty may limit their use. A known method of attaching these fasteners to a multitude of members has been to stitch the fasteners to the item. Such stitching procedure however is sometimes laborious, and is not always available for attachment to bulky items. In particular wider strips are advantageous for attachment to objects having surface delamination problems. Bonding or adhesively securing the fastener to other items requires pressing the areas to be joined together for substantial lengths of time to permit curing of the bonding agent. In addition, when pressing the active areas of the fasteners against the substrate member the hooks and/or loops of the fastener strips are often so deformed and crushed that the tapes no longer function satisfactorily and the repeated fastening is no longer assured. Further, adhesive attachment requires adhesive compatibility between the fastener, the adhesive and the adhesive of the object to which it will be attached.

For attachment of the fasteners to other objects such as polyurethane foam seat cushions or the like, fastening of the tapes has been difficult due to the lack of suitable adhesives or fastening techniques. In fact, in the case of seat cushions, such fasteners would make it possible to separably attach seat covers or the like. Further, attachment of the fasteners to other known objects would facilitate attachment and detachment of known functioning items or appurtenances which would not otherwise be possible.

It has been proposed in the prior art to attach the separable fastener strip to a substrate of absorbent or porous material such as a non-woven material. The fastener thus modified is attached to foam plastic articles by positioning the adapted fastener within the mold such that it absorbs the foam forming materials while they are in their liquid state.

Under certain conditions and for unknown reasons the fastener-absorbent backing assembly sometimes produces unsatisfactory results. For example, in some instances, relatively large areas of delamination occur along the connection of the backing and the foam article. It is believed such delamination is caused by skinning of the polymerizing material at the interface of the article and the backing with the result that excess gases formed by the process become trapped thus creating large delaminating bubbles rather than a secure attachment.

SUMMARY OF THE INVENTION

I have invented a method which adapts such separable fasteners for attachment to known objects either by known adhesives or by attachment to plastic foam objects during the actual molding or other process of formation of the object, while avoiding the disadvantages of the prior art.

This invention comprises a method of adapting a separable fastener member of the hook and loop-type for attachment to an object. The steps comprise taking a separable fastener member having a plurality of hook-type or loop-type engaging elements upstanding from one surface; and, simultaneously attaching the separable fastener member to a second member positioned in back to back relation with the surface of the fastener member opposite the surface having the engaging elements. The second member has a plurality of elements upstanding from the opposite surface, and the elements are capable of being surrounded and encapsulated by a material forming at least a part of the object.

The method of the invention may accomplish the attaching step by ultrasonic attachment means, such as ultrasonically stitching the separable fastener member to the second member.

Alternatively, the method may use an attaching step which comprises the steps of applying an adhesive material to the second member, and positioning the separable fastener member against the adhesive material such that upon curing or drying of the adhesive material, the separable fastener member becomes adhesively attached to the second member. In this case the adhesive may be a hot-melt adhesive. When the hot-melt adhesive is used the method may further include subsequently directing the separable fastener member and second member through a cooling zone to shorten the setting time of the hot melt adhesive.

A second alternative is the use of solvent based adhesives in which instance the separable fastener member, and second member may be directed through solvent removing means, to thereby shorten the setting time of the adhesive disposed therebetween.

In any event the method may also include disposing a metal strip between the separable fastener member and second member so as to render them magnetically attractive. Once adapted the separable fastener may be attached to a synthetic foam member.

A further method of the invention produces a foam plastic article with a separable fastener attached thereto by taking a separable fastener member having a plurality of hook-type or loop-type engaging elements upstanding from one surface; attaching the separable fastener member to a second member positioned in back to back relation with the surface of the fastener member opposite the surface having engaging elements. The second member has a plurality of elements upstanding from the opposite surface, which elements are capable of being surrounded and encapsulated by a material forming at least a part of said article. This is followed by the steps of placing the separable fastener member and second member assembly into a trough of a mold unit such that the elements extend into the inner space of the mold; filling the mold with plastic foam forming components in liquid form; allowing the forming components to surround and encapsulate the elements without the elements interfering with the free escape of excess gas from the space surrounding the elements; and, allowing said foam forming materials to cure, dry or set while encapsulating the elements thereby creating a foam plastic article with said separable fastener attached thereto with its upstanding engaging elements extending away from the surface of the article. The article may be modified by positioning a protective cover over the engaging elements to protect them from contamination by the foam forming components. A further step may include heating the foam plastic article thus formed to thereby cure the plastic foam material.

When the heat curing step is used, the protective covering may advantageously be a polyethylene layer which melts and disintegrates when subject to the heat of curing of the foam plastic material.

The invention also includes an adapted separable fastener for attachment to a foam plastic article. This fastener comprises a separable fastener member of the hook and loop-type; a second member attached to said separable fastener member in back to back relation on the side of said separable fastener member opposite the side having said engaging elements; and a plurality of spaced elements extending from said second member which may be surrounded and encapsulated by plastic forming at least part of said foam plastic article.

The adapted separable fastener of the second member may be woven hook-type separable fastener tape prior to cutting the elements to form hooks, or woven hook-type separable fastener tape.

The adapted separable fastener may be such that the second member is adhesively attached to the separable fastener. In this case the adhesive is a hot-melt adhesive, or a liquid based adhesive.

In some applications the adhesive is a solvent based adhesive. Alternatively, the adhesive is a water based adhesive, or an epoxy resin.

The invention also includes the adapted separable fastener for attachment to a foam plastic article comprising a separable fastener member of the hook and loop-type; a second member attached to the separable fastener member in back to back relation on the side of the separable fastener member opposite the side having the engaging elements; and a plurality of elements extending from the second member which are capable of being surrounded and encapsulated by plastic foam forming components while permitting the free escape of gas by-products produced by polymerization of the components thereby permitting attachment of said separable fastener member and said second member to the finished foam article. The plurality of elements may comprise spaced upstanding loop-like elements extending from the surface of the second member opposite the surface attached to said separable fastener member.

The loops are preferably about one-eighth inch and three-eighths inch in height. In one embodiment the second member and elements are hook-type separable fastener members. Also, a metal strip may be disposed between the separable fastener member and the second member so as to render the adapted fastener magnetically attractive for secure positioning within a forming mold supplied with heavy duty magnets in predetermined locations.

A method for attaching a separable fastener to a foam plastic object is also part of the invention. The steps include taking a separable fastener member having a plurality of hook-type or loop type engaging elements upstanding from one surface; positioning a metal strip in back to back relation with the surface of the fastener member opposite the surface having engaging elements; and adapting the separable fastener member for attachment to the foam plastic article by attaching the separable fastener member to a second member positioned in back to back relation with the surface of the fastener member opposite the surface having engaging elements thereby sandwiching the metal strip therebetween. The second member has a plurality of elements upstanding from the opposite surface which are capable of being surrounded and encapsulated by a material forming at least part of said object. Further steps include positioning the adapted separable fastener member in a trough of a mold unit which trough has magnetic means to maintain the adapted fastener in position in the trough by magnetic attraction to said metal strip, the adapted fastener being positioned such that the elements extend into the inner space defined by the mold; introducing foam forming components in liquid form into said mold so as to permit the components to flow into and around said plurality of upstanding elements; allowing the foam forming components to surround and encapsulate the elements while undergoing polymerization and permitting free venting of excess gases formed by the polymerization process.

This method may advantageously include attaching a plastic protective covering to the assembly, prior to placing the assembly in the trough, in a position covering the engaging elements of the separable fastener so as to protect same from contamination by foam forming components.

The method may further include placing the object in a curing oven after molding in order to cure the foam and melt away the plastic protective covering.

DETAILED DESCRIPTION OF THE DRAWINGS

FIG. 2 is a view of the ultrasonic stitching apparatus of one embodiment of the apparatus taken along lines 2—2 of FIG. 1.

FIG. 3 is a cross-sectional view of the completed adapted fastener of the invention showing a separable fastener tape of molded plastic construction, a backing, a substrate, and a protective liner.

FIG. 4 is a cross-sectional view of the completed adapted fastener of the invention taken along lines 4—4 of FIG. 3.

FIG. 4A is a partial cross-sectional view of an alternate form of hook-type separable fastener tape of woven construction.

FIG. 4B is a partial cross-sectional view of the adapted fastener of the invention incorporating an alternate form of hook-type separable fastener tapes having hooking elements having a mushroom configuration.

FIG. 5 is a perspective view of an adapted separable fastener and a polyurethane foam forming mold with trough for receiving and holding the adapted fastener during the molding process for molding an automobile seat cushion.

FIG. 6 is an enlarged view, partially broken away, of the ultrasonic horn and anvil showing the ultrasonic stitching process of one embodiment of the invention.

FIG. 7 is a side elevational view of the second ultrasonic horn of one embodiment of the invention.

DESCRIPTION OF THE PREFERRED EMBODIMENTS

Figure 1:
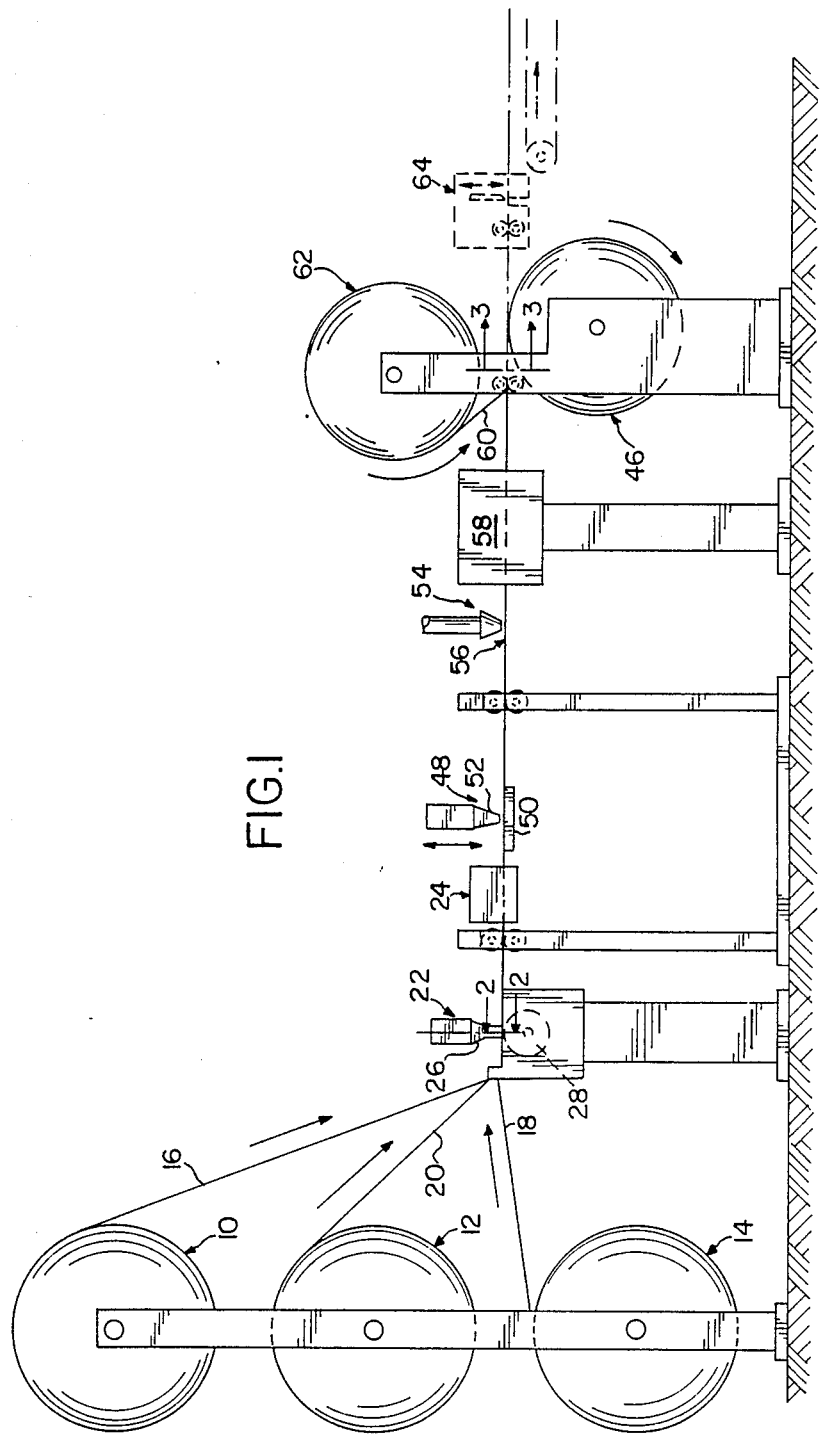
FIG. 1 is an elevational view of the apparatus of the invention for practicing the inventive method of adapting a hook and loop-type separable fastener member for attachment to another object.
Figure 9:
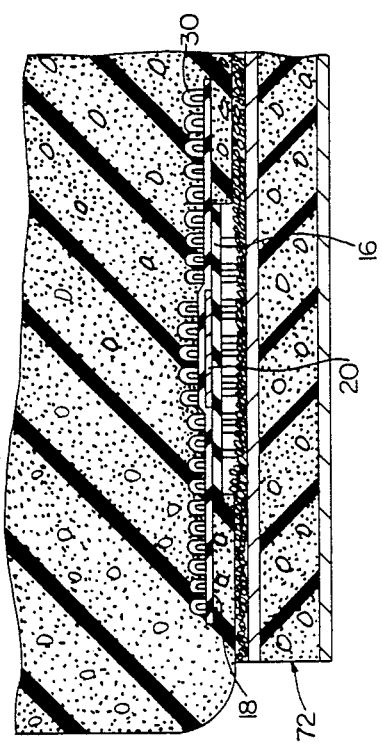
FIG. 9 is a cross-sectional view taken along lines 9—9 of FIG. 8 illustrating the attachment interface between the adapted fastener and the seat cushion of FIG. 8.

The apparatus used for adapting the separable fastener member is shown overall in FIG. 1 with further details illustrated in FIGS. 2 and 6. The apparatus shown in FIG. 1 is comprised of feeder rolls 10, 12 and 14 which feed the strips of hook tape 16, substrate 18 and metal strip 20 to the attaching unit 22. The attaching unit 22 may take a number of forms but is preferably a continuous ultrasonic stitching machine. For example, it may also be an adhesive applicator in conjunction with pressure rollers and a setting (or curing) station 24. The adhesive may be a hot melt adhesive in which case the setting station would be a refrigeration unit. Alternatively the adhesive may be liquid, either water or solvent based, in which instance the setting station would be a solvent removing means such as an oven. The preferred attaching unit is shown as an ultrasonic stitching device which ultrasonically stitches the members together. This type of unit is comprised of a horn 26 and anvil 28. The hook tape 16 may be molded or woven but is preferably molded for automobile seat cushion applications as will be described below. The molded hook tape is preferably of nylon and the substrate 18 is preferably of woven construction and of a material which is ultrasonically compatible with the hook tape. The substrate 18 has a plurality of elements 30 upstanding from one surface.

In the preferred embodiment, the hook tape 16 of the type disclosed in U.S. Pat. Nos. 3,708,833 to Ribich et al and 3,762,000 to Menzin et al. molded tape 16 is fed into ultrasonic stitching machine 34 with the hook side 32 facing upward that is, toward the top of FIG. 1. The ultrasonic stitching machine 34 is comprised of two major parts, the horn 26 and the anvil 28 which includes a central sprocket-like portion 36 and two outside stitching lands 38. The outside lands 38 are operative for part of the actual stitching process while the center sprocket 36 acts to feed and center the substrate material. The two outside lands are spaced in such a manner that they ride just inside the edges of the separable fastener tape, that is, the width of their separation is determined by the width of the separable fastener to be adapted.

The two outside lands 38 have a shape similar to a sprocket, but on a smaller scale than the central sprocket-like portion 36. They each have a series of tooth-like projections 40 spaced approximately 1/32 of an inch apart along the circumference of each land. In one embodiment, each projection is approximately 3/16 of an inch long as measured in the direction of the circumference, ⅛ of an inch in width and of suitable height sufficient to permit the horn to apply pressure to the tape when the tape is supported on the lands. Each projection supports the members to be attached and has a small groove on its peak surface running in a direction transverse to the length of the tape. One function of this groove is to provide relief for the softened material.

The desired substrate 18 moves toward, and is mated in back-to-back engagement with the separable fastener tape 16 to be adapted. In the preferred embodiment a strip of metal 20 is disposed between the separable fastener tape 16 and the substrate 18. The metal strip 20 adds a magnetically attractive property to the fastener for purposes which will be described below. The separable fastener tape 16 and metal strip 20 are fed onto the substrate 18 by rollers 10, 12 and 14. The separable fastener tape 16, the metal strip 20 and the substrate 18 are held in their relative positions and orientation as they pass between the anvil 28 and the ultrasonic horn 26. The ultrasonic horn 26 is positioned against the hook-tape 16 as indicated in FIGS. 1, 2, and 6, that is, the ultrasonic horn 26 moves toward the anvil 28 while applying ultrasonic energy to the components as they pass between the horn and the anvil. The ultrasonic horn is positioned such that as each land rotates to its peak position, the fastener and substrate are squeezed between the anvil and horn and continuously welded together by the ultrasonic energy provided by the horn when the fastener and substrate and supported by the anvil. The center section of the horn has an opening 42 such that the hooking elements of the tape pass through without interference. The motions of the horn 26 and anvil 28 create a continuous series of ultrasonic stitches which appear on the tape as a series of spaced indentations. In one embodiment, each stitch is approximately 1/32 of an inch long (as measured in the lengthwise direction of the tape and spaced about 1/16 of an inch apart). The tape is left intact between each stitch. Thereafter, the resultant product is a strip of substrate ultrasonically stitched to a separable fastener tape with the hooks of the tape facing upward and a metal strip disposed therebetween. The substrate is preferably wider than the separable fastener and this leaves a margin of about ¼ inch of substrate extending beyond the separable fastener on either side.

The structure of substrate 18 is crucial to the invention to provide gas release and good adhesion without delamination or imperfections in the foam. The substrate 18 has a plurality of elements 30 upstanding from the surface of a base 44 which is usually of woven construction. The loops are arranged in generally parallel spaced apart non-overlapping rows contain individual spaced apart non-overlapping loop elements (see FIGS. 3 and 4). The elements are spaced to allow free movement of foam forming components and gases around them. In the preferred embodiment, an uncut woven hook-type separable fastener tape is used as the substrate. That is, the usual hook-type tape is produced on a loom. The tape is of the type usually made of woven nylon base having monofilament nylon loops extending from one surface which are ultimately cut to form hook-type hooking elements. However, for the present application, when the tape is to be used as a substrate, the loop cutting process is bypassed and the loops remain as loops per se (i.e., uncut hooks). These loops are preferably from approximately ⅛ inch to ¼ inch in height and number approximately thirty-two in a line traversing a one and three-quarter inch width tape. However, depending upon the actual foam-forming components used, and the degree of attachment which is desired, any size and density monofilament loops may be used. In fact, depending upon the precise circumstances, it is foreseeable to utilize other types of loops, such as multifilament loops, provided that the actual loop density and the foam forming components and by-products thereof are precisely matched as will be more accurately described below.

After the separable fastener has been attached to the substrate the adapted fastener can either be rolled up on a spool 46 or cut to desired lengths. Other operations may be performed on the product between the ultrasonic stitching machine 34 and the take up spool 46 to improve or facilitate end use of the product. In FIG. 1 the product exits the ultrasonic stitching machine (or alternate attaching unit) and enters a second ultrasonic machine 48. This station differs from the previous ultrasonic station in that it has a flat anvil surface 50 in place of the rotary anvil at the first station. This second station is only used when strips of predetermined length are desired. The second horn 52 has no space to permit the hooking elements to pass without interference. In operation the tape is measured by measuring means which is usually automatic. When the point on the tape where a cut is to be made has been determined the second horn comes down and ultrasonically flattens a predetermined area of the hooks of the molded tape and at the same time welds them so as to be combined with the tape surface. This provides a broad weld area where a cut can be made at a cutting station 54, which cut will leave two finished ends. The horn 52 is raised above the hooking elements to allow their passing without interference between points to be marked.

The product may also pass under a hot-melt adhesive dispenser 54 which applies adhesive to the margins 56 of the product formed by the substrate extending beYond the width of the fastener. The product and adhesive are passed through a refrigerated area 58 to cool the hot-melt adhesive partially, before applying a protective polyethylene liner 60 from spool 62. The cooling is necessary for the proper function of the adhesive with the protective liner 60. The liner protects the hooks and adhesive in packaging (i.e. rolling on a reel) and also prevents the foam forming components from contaminating the active hooking elements during the molding process discussed below.

After the adhesive and liner have been applied, the continuous tape is run through a cutting apparatus 64. The cutting apparatus cuts the tape across a point substantially centered in the weld area created by the second ultrasonic horn. In this manner the fastener is completely adapted for use while in continuous form and finally cut to lengths desired leaving finished ends on the product.

As shown in FIG. 5, the adapted fastener is placed in a pre-cut trough 66 defined by walls 68, of a mold 70 for attaching the adapted fastener to a polyurethane molded object such as an automobile seat cushion. The fastener is placed with the polyethylene liner covered hooks facing into the trough 66 and the substrate 18 exposed to the internal area of the mold and elements 30 upstanding into the mold cavity. Within trough 66 are heavy duty magnets 70. The magnets 70 attract the metal strip 20 toward the bottom of the trough and thus maintain the adapted separable fastener securely in position against the mold during the molding process.

When the mold is filled with polyurethane foam forming components, the foam forming materials actually envelop the elements 30 of substrate 18 while simultaneously undergoing polymerization. The foam forming components expand and fill the recess formed by the walls of the mold 70, and form the seat cushion. Unnecessary gaseous by-products of polymerization are readily vented past the monofilament loops, thus facilitating unencumbered polymerization and secure envelopment of, and attachment to, the monofilament loops so that the adapted fastener is firmly secured to the seat cushion when it is removed from the mold. When the forming components finally expand and set, the separable fastener remains securely attached to the seat cushion by virtue of the fact that the upstanding loop elements 30 become encapsulated by the polymerized foam material. Other synthetic resin foam forming components such as polystyrene or polyvinyl chloride may be used in place of polyurethane foam forming components.

It can be readily appreciated from the foregoing that alternate foams of substrate material, other than materials having upstanding monofilament loops, may be used. Such material should have upstanding members which are compatible with the foam material used so that attachment is readily and securely attained. Also such substrates must have upstanding members which are dimensioned for attachment and which are particularly spaced to permit venting of gaseous by-products while eliminating problems of skinning and delamination as was sometimes encountered in prior art attempts. In fact, it can be appreciated that it would be possible to utilize a multifilament loop material (i.e., the mating half of hook and loop separable fastener tape) provided that the multifilament loop area density and height are controlled to facilitate compatible attachment to the foam material. Further, so long as the upstanding members are attachable to the foam material, they may take any form or shape such as, for example, monofilament cut hooks, mushroom elements, or even molded upstanding elements. In the latter example, it is foreseeable within the scope of the invention, to attach two molded hook-type fastener loops in back-to-back relation, one side for attachment to the foam member, the other for attachment to another mating surface, such as the napped or fuzzy surface of an automobile seat cover.

As noted, the elements 30 are thus firmly embedded in and encapsulated by the foam. Any foam which is formed from components which may have leaked around the edges of the adapted fastener during the molding process may be brushed away. This is easily done as the polyethylene liner is still intact since most foams will not adhere to polyethylene. The formed object is then directed through a curing oven at about 250° F. which causes the polyethylene liner to melt and disintegrate.

Figure 8:
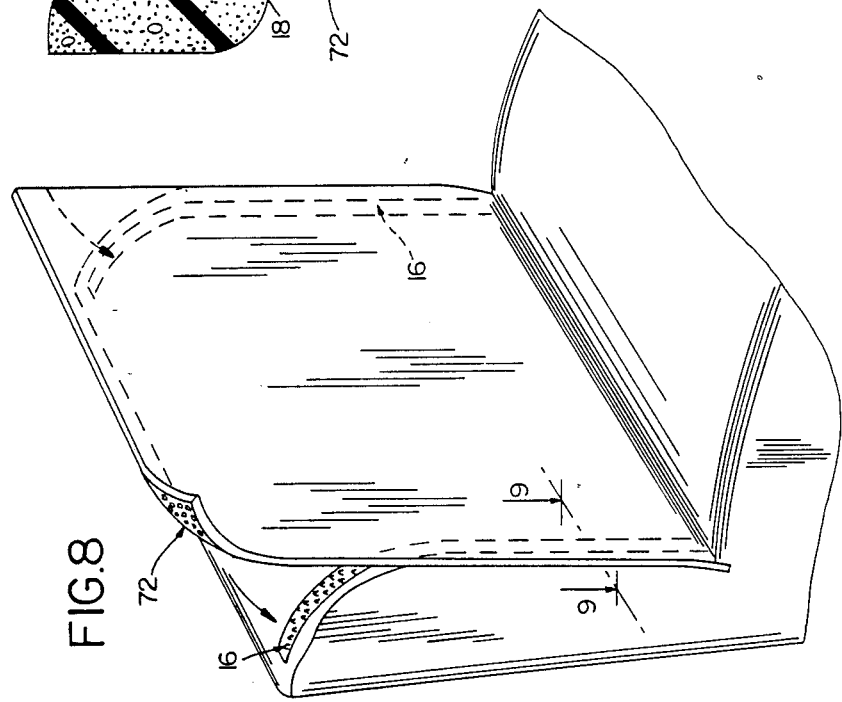
FIG. 8 shows the adapted separable fastener used to hold automotive upholstery onto a polyurethane seat cushion after the adapted fastener is secured by the molding process to the foam material of the seat cushion.

The finished automobile foam seat cushion shown in FIG. 8 illustrates the preferred application of the present invention wherein seat cover material 72 has a napped or fuzzy backing which readily engages and disengages to the foam cushion to provide a readily attachable cover. As noted, the backing of the material 72 may be a loop-type or natural napped fuzzy backing, or alternatively, corresponding mating loop fastener members may be stitched or otherwise secured to the rear surface of the cover material 72. It will be appreciated that the proper alignment of the seat cover material with respect to the foam cushion is readily obtainable by the multiplicity of attachments and relative positions available through the use of the adapted separable fastener of the invention. Further, it can be appreciated that the adapted separable fastener of the invention can be utilized for a multitude of applications in which attachment can be made to other settable or curable materials, including such materials as adhesives, cement or the like.

By way of further example it is also possible to attach the adapted fastener to any object such as a concrete or cement block wall and to thereafter attach objects such as wall paneling adapted to be separably fastened to the adapted fastener strips.

FIG. 4 illustrates the adapted fastener in which a molded hook-tape is used as the fastener having upstanding hooks or spear-like members molded integrally with the base. FIG. 4A illustrates an alternate form of hook tape namely the woven type nylon or polyester hook tape having upstanding monofilament hooks interwoven first as loops with the base and thereafter cut to form hooks. This form may also be of knitted construction. FIG. 4B illustrates the use of mushroom tape being either of woven or knitted construction and having upstanding mushroom like members which are formed either by heat or other deforming techniques. Other alternate forms of hook tapes and substrates may be used to practice the invention and such tapes may be formed by a multitude of fabricating techniques. It is important, however, that the members utilized satisfy the above-noted parameters and that they are ultrasonically compatible with each other and with the foam or other material to which the adapted fastener is to be attached.

I claim:

1. An adapted separable fastener for attachment to a foam plastic article comprising:
   (a) a separable fastener member having a base member and a plurality of one portion of engaging elements upstanding from one surface thereof;
   (b) a second member attached to said separable fastener member in back to back engaged relation on the side of said separable fastener member opposite the side having said plurality of upstanding engaging elements; and
   (c) a plurality of generally parallel spaced apart non-overlapping rows of individual spaced apart non-overlapping monofilamentary loop elements upstanding from the surface of said second member opposite the surface in engagement with said separable fastener member, said spaced apart monofilamentary loop elements each defined by two leg portions each attached at one end to said base member and connected to each other at the other end by a connecting portion which completes said loop each of said spaced apart rows being sufficiently spaced from all adjacent rows and each said loop element being so dimensioned and spaced with respect to adjacent loop elements that they may be substantially completely surrounded and encapsulated by foam plastic material which forms at least part of said foam plastic article thereby firmly attaching said separable fastener member to said foam plastic article without the existence of delaminated portions or trapped gases formed during foaming.

2. The adapted separable fastener according to claim 1 wherein said second member is woven separable fastener tape prior to cutting the loops to form hooks.

3. The adapted separable fastener according to claim 1 wherein said second member is adhesively attached to said separable fastener.

4. The adapted separable fastener according to claim 3 wherein said adhesive is a hot-melt adhesive.

5. The adapted separable fastener according to claim 3 wherein said adhesive is liquid based.

6. The adapted separable fastener according to claim 5 wherein said adhesive is a solvent based adhesive.

7. The adapted separable fastener according to claim 5 wherein said adhesive is a water based resin.

8. The adapted separable fastener according to claim 3 wherein said adhesive is an epoxy resin.

9. An adapted separable fastener for attachment to a foam plastic article comprising:
   (a) a separable fastener member having a base member and a plurality of one portion of engaging elements upstanding from one surface thereof;
   (b) a second member attached to said separable fastener member in back to back engaged relation to the side of said separable fastener member opposite the side having said plurality of upstanding engaging elements; and
   (c) a plurality of generally parallel spaced apart non-overlapping rows of individual spaced apart non-overlapping monofilamentary loop elements upstanding from the surface of said second member opposite the surface in engagement with said separable fastener member, said spaced apart monofilamentary loop elements each defined by two leg portions each attached at one end to said base member and being connected at the other end by a connecting portion which completes said loop, each of said spaced apart rows being sufficiently spaced from all adjacent rows and each loop element being spaced with respect to all adjacent loop elements so as to be capable of being surrounded and encapsulated by plastic foam forming components while facilitating the free escape of gas by-products produced by polymerization of the components thereby permitting substantial attachment of said second member and said separable fastener member to the finished foam article.

10. The adapted separable fastener according to claim 9 wherein said plurality of elements comprises spaced upstanding loop elements extending from the surface of said second member opposite the surface attached to said separable fastener member.

11. The adapted separable fastener according to claim 10 wherein said loops are between about one-eighth inch and about three-eighths inch in height.

12. The adapted separable fastener according to claim 9 wherein said second member and said elements are hook-shaped separable fastener members.

13. The adapted separable fastener member according to any one of the claims 1–12 further comprising a metal strip disposed between the separable fastener member and said second member.

14. An adapted separable fastener for attachment to a foam plastic article comprising:
   (a) a separable fastener member having a base member and a plurality of one portion of engaging elements upstanding from one surface thereof;
   (b) a second member attached to said separable fastener member in back to back engaged relation on the side of said separable fastener member opposite the side having said plurality of upstanding engaging elements; and (c) a plurality of generally parallel spaced apart non-overlapping rows of freestanding substantially rigid individual spaced apart non-overlapping monofilamentary loop elements upstanding from the surface of said second member opposite the surface in engagement with said separable fastener, said spaced apart monofilamentary loop elements each defined by two leg portions each attached at the lower end to said base member and connected to each other at the upper end by a connecting portion which completes said loop, each row of said monofilament loop elements being so spaced with respect to adjacent rows of loop elements and each loop element being sufficiently spaced from all adjacent elements so that each loop element may be substantially completely surrounded and encapsulated by foam plastic material during foam formation by liquid plastic foam forming components which form at least part of said foam plastic article thereby firmly attached said second member and said separable fastener member to said foam plastic article by full absorption of the liquid foam forming components without trapping gases formed during said plastic foam formation thereby preventing the development of delaminated portions at the interface and surrounding area between said second member and the plastic foam article.

15. A covered article with fabric covering comprising:
(a) an object of synthetic foam material;
(b) an elongated separable fastener member having a surface defined by a plurality of one portion of engaging elements upstanding therefrom;
(c) a second member ultrasonically attached to said separable fastener member in back to back engaged relation on the surface of said separable fastener member opposite the surface having said plurality of upstanding engaging elements;
(d) a plurality of generally parallel spaced apart non-overlapping rows of individual spaced apart non-overlapping monofilamentary loop elements upstanding from the surface of said second member opposite the surface in engagement with said separable fastener member, said spaced apart monofilament loop elements each defined by two leg portions each attached at one end to said base member and connected to each other at the other end by a connecting portion which completes said loop, each of said spaced apart rows of monofilamentary loop elements being sufficiently spaced from all adjacent rows of monofilamentary loop elements and each said loop element being so dimensioned and spaced with respect to all adjacent loop elements that the loop elements are substantially completely surrounded and encapsulated by foam plastic material which forms at least part of said foam plastic article thereby firmly attaching said second member and said separable fastener member to said foam plastic article without the existence of delaminated portions of trapped gases formed during foaming;
(e) fabric cover means attached to said synthetic foam object by means of a surface of corresponding mating separable fastener means having a plurality of the other portion of mating engaging elements which engage with said first mentioned portion of engaging elements of said separable fastener member when said mating surfaces are pressed in face to face engaged relation such that said cover can be selectively attached and detached.

16. The adapted separable fastener as in any one of claims 1, 2, 9, 14 and 15, wherein said engaging elements of said separable fastener member are of a shape selected from the group consisting of: hooks, spears, and mushrooms.

* * * * *